United States Patent [19]
Oswald et al.

[11] 3,742,098
[45] June 26, 1973

[54] PROCESS FOR THE PREPARATION OF S-VINYLIC ESTERS OF THIOPHOSPHORUS ACIDS

[75] Inventors: Alexis A. Oswald, Mountainside, N.J.; Joseph H. Lesser, Woodside, N.Y.

[73] Assignee: Esso Research and Engineering Company, Linden, N.J.

[22] Filed: July 7, 1969

[21] Appl. No.: 839,645

[52] U.S. Cl. ......... 260/971, 204/162 R, 260/455 P, 260/926, 260/928, 260/930, 260/934, 260/940, 260/941, 260/946, 260/947, 260/948, 260/949, 260/950, 260/953, 260/954, 260/957, 424/205, 424/210, 424/212, 424/214, 424/216

[51] Int. Cl. ........................... C07f 9/16, A01n 9/36

[58] Field of Search .......................... 260/934, 971; 204/162 R

[56] References Cited
UNITED STATES PATENTS
3,021,352   2/1962   Miller .................................. 260/971

*Primary Examiner*—Lewis Gotts
*Assistant Examiner*—Anton H. Sutto
*Attorney*—Chasan and Sinnock and Michael Conner

[57] ABSTRACT

Phosphoryl disulfides can be added to acetylenes to form S-vinylic thiophosphate esters. The additions occur by way of a free radical mechanism in the presence of radiation and/or chemical initiators. The adducts are highly effective as pesticides.

1 Claim, No Drawings

PROCESS FOR THE PREPARATION OF S-VINYLIC ESTERS OF THIOPHOSPHORUS ACIDS

FIELD OF THE INVENTION

This invention relates to novel reactions of thiophosphoryl disulfides with acetylenes, to new S-vinylic thiophosphorus acid esters therefrom, and to their use as plant and animal pesticides.

More particularly, this invention relates to the liquid phase free radical monoaddition of bis-diorgano phosphoryl disulfides and unsymmetrical diorgano phosphoryl disulfides to the triple bond of acetylenic compounds to yield the corresponding vinylic mono- and diesters of thiophosphorus acids. These esters represent novel types of organophosphorus compounds having utility as pesticides and animal health agents. Their utility is particularly due to their insecticidal and miticidal activity.

PRIOR ART

Esters of thiophosphorus acids possess properties which make many of them suitable as pesticides. For reference, see the monograph, "Die Entwicklung neuer Insektizider Phosphorsaure-Ester" written by Gerhard Schrader and published by Verlag Chemie Gmbh., Weinheim, W. Germany in 1963. As a consequence of the outstanding use characteristics of such esters, further research was initiated to discover novel, advantageous methods of preparation and new, superior types of compounds.

The preparation of S-vinylic esters of dialkyl thiophosphoric acids, related to the compositions made available by the present process, was described by W. R. Diveley in U.S. Pat. No. 2,864,740. Diveley's method involved the addition of alkanesulfenyl chlorides to terminally unsubstituted vinyl esters followed by dehydrochlorination.

The present method of adding thiophosphoryl disulfides to acetylenes has no direct precedence. Very little is known about the addition of thiophosphoryl disulfides to other types of unsaturated compounds as well.

The addition of diethoxy thiophosphoryl disulfide to a highly activated olefinic compound such as dioxene is known (J.Am. Chem. Soc. Vol. 81, pages 139-144 (1959)). This reaction takes place in the presence of iodine as a catalyst, presumably by way of an ionic mechanism.

Simple nonactivated olefins such as propylene do not react with thiophosphoryl disulfides under free radical conditions, presumably due to the insufficient reactivity for abstraction of the intermediate adduct radicals and to the high degree of reversibility of the initial addition step.

The present invention provides for the monoaddition of thiophosphoryl disulfides to acetylenes in a free radical chain reaction. Using unsymmetrical disulfides, for example thiophosphoryl hydrocarbyl disulfides, the reaction occurs in a highly specific manner. The novel monoadducts of the present invention cannot be prepared by other, known methods. As pesticides they are superior to related known compounds.

For example, the prior art compounds disclosed by Diveley are unsubstituted or α-substituted β-alkylthiovinyl esters of thiophosphoric acids (I) while the monosubstituted acetylene adducts of the present invention are β-substituted (II) as shown by the following formulas:

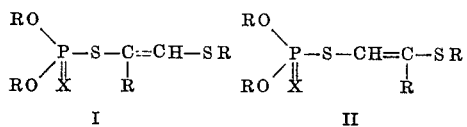

wherein X is sulfur or oxygen and R is lower alkyl. α-substituted, i.e., secondary esters of dialkyl thiophosphoric and phosphonic acids (I) are hydrolytically less stable than the corresponding β-substituted, i.e. primary esters. For reference see p. 422 of the monograph "DieEntwicklung neuer insektizider Phosphorsaure-Ester" by G. Schrader, Verlag Chemie, Weinheim/Bergstr., W. Germany, 1963 and pages 144 to 146 of The Journal of the Chemical Society, 1969, i.e. an article by J.I.G. Cadogan, D. Eastlick, F. Hampson and R. K. Mackie. Therefore, the use of the novel β-substituted compounds for pest control, e.g., as aqueous emulsions, is advantageous.

SUMMARY OF THE INVENTION

In accordance with the present invention, a diorgano phosphoryl disulfide is added to the triple bond of an acetylene compound to yield the corresponding S-vinyl ester of diorgano thiophosphorus acid. Preferably, the addition takes place in the liquid phase by way of a free radical type mechanism initiated by free radical initiators such as radiation initiators and/or chemical initiators.

The phosphoryl disulfide reactants of the present invention have the general formula:

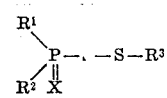

wherein X is sulfur or oxygen; $R^1$ and $R^2$ independently represent $C_1$ to $C_{30}$ organic radicals such as unsubstituted and substituted preferably monosubstituted hydrocarbyl, hydrocarbyloxy and hydrocarbylthio radicals; $R^3$ can be a $C_1$ to $C_{30}$ hydrocarbyl or substituted hydrocarbyl radical or a $C_1$ to $C_{30}$ acyl radical such as diorganophosphoryl, i.e., $R^1R^2P(X)$; xanthyl, i.e., $R^6XC(X)$ where $R^6$ is alkyl; acyl, i.e., $R^7C(X)$ where $R^7$ is unsubstituted or monosubstituted hydrocarbyl, preferably unsubstituted or preferably monosubstituted alkyl or phenyl.

It is to be noted that the term "substituted" as utilized in the present invention refers to the substitution into the above-mentioned hydrocarbyl, hydrocarbyloxy and hydrocarbylthio radicals of a functional moiety such as halogen, cyano, alkyl-sulfonyl, alkoxy, alkylthio, nitro, arylsulfoxy, carboalkoxy, acetyl, phenyloxy, etc.

Although $R^1$, $R^2$, $R^3$, $R^6$, $R^7$ generally designate $C_1$ to $C_{30}$ organic radicals, it is preferable to have radicals having $C_1$ to $C_{12}$ carbon atoms and most preferably radicals having $C_1$ to $C_4$ carbon atoms.

$R^1$ and $R^2$ are most preferably identical $C_1$ to $C_4$ alkyloxy radicals, most preferably ethoxy. In another more preferred case, $R^1$ is $C_1$ to $C_4$ alkyl, $C_1$ to $C_4$ monosubstituted alkyl, phenyl or $C_6$ to $C_8$ substituted phenyl, most preferably methyl, ethyl, or propyl; while $R^2$ is $C_1$ to $C_4$ alkyloxy, $C_1$ to $C_4$ alkylthio, most preferably, methyloxy, ethyloxy or n-propylthio. The aliphatic radicals suitable for $R^1$ and $R^2$ include olefinic groups such as chlorovinyl, cyanoallyl, crotyl, but exclude acetylenic groups.

The R³ organic radical is more preferably a C₁ to C₄ alkyl radical, most preferably methyl, ethyl or n-propyl. Another preferred meaning of the R³ radical is substituted phenyl such as chlorophenyl, trichlorophenyl, cyanophenyl, ethylsulfonylphenyl.

In the case of a symmetrical disulfide reactant, R³ is of course, a diorganophosphoryl group, i.e., R¹R²P(X).

The diorganophosphoryl disulfide reactant is preferably selected from the group consisting of phosphoryl, phosphonyl and phosphinyl disulfides. In these disulfides the bonding of the organic moiety to the phosphorus is different as shown by the following formula:

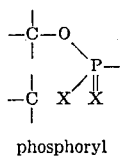 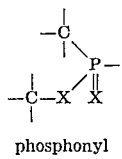 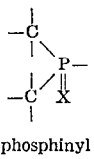

phosphoryl     phosphonyl     phosphinyl

Some typical examples for R¹ and R² groups are the following: methoxy, cetyloxy, hexadecyl phenylthio, naphthyloxy, ethylthio, methyl, hydroxymethyl, chloromethyl, propyloxymethyl, crotylthio, phenyl, xylyl, benzylthio, chlorophenylethylthio, butylthio, dodecyloxy, dichlorovinyl, methylthioethyl, ethylsulfonyl methyl, propenylthio, tricosyloxy.

Examples for the R³ group are: methyl, butyl, octadecyl, phenyl, hexadecylphenyl, phenylbutyl, chloropropyl, tirchlorophenyl, methylsulfonylphenyl, carboethoxymethyl, diethoxy thiophosphoryl, acetyl, benzoyl, ethyl xanthyl.

The preferred unsymmetrical phosphoryl disulfide reactants can be characterized by the general formula

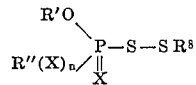

wherein R, R″ and R⁸ are C₁ to C₃₀ preferably C₁ to C₁₂ hydrocarbyl, more preferably C₁ to C₄ alkyl; X can be sulfur or oxygen and $n$ is one or zero.

Preferred ranges for specific types of diorgano phosphoryl disulfide reactants are shown by the following tabulation:

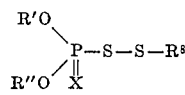

C₁ to C₁₂ dihydrocarbyloxy, preferably C₁ to C₄ dialkyloxy phosphoryl C₁ to C₁₂ hydrocarbyl disulfides.

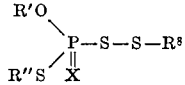

C₁ to C₁₂ hydrocarbyloxy, preferably C₁ to C₄ alkyloxy, C₁ to C₁₂ preferably C₁ to C₄ alkylthio phosphoryl C₁ to C₁₂ hydrocarbyl disulfides.

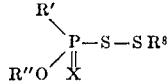

C₁ to C₁₂ hydrocarbyloxy C₁ to C₁₂ hydrocarbon, preferably C₁ to C₄ alkyloxy, C₁ to C₄ alkano phosphonyl C₁ to C₁₂ hydrocarbyl disulfides.

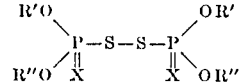

bis-(C₁ to C₁₂ hydrocarbyloxy) preferably bis-(C₁ to C₄ dialkyloxy phosphoryl)-disulfides wherein X is sulfur and oxygen.

Examples of useful phosphoryl disulfides include: diethoxy phosphoryl methyl disulfide, dicetyloxy phosphoryl octyl disulfide, dichlorophenyloxy thiophosphoryl benzyl disulfide, dicrotyloxy phosphoryl cetyl disulfide, didodecylphenyloxy thiophosphoryl naphthyl disulfide, dibenzyloxy thiophosphoryl propyl disulfide, dicyanoallyloxy thiophosphoryl dichlorophenyl disulfide. Ethoxy ethylthiophosphoryl cetyl disulfide, methoxy propylthio phosphoryl dodecylphenyl disulfide, ethoxy dodecylthiophosphoryl methyl disulfide, phenyloxy octylthio phosphoryl dichlorophenyl disulfide, ethoxy methylthio ethylthio phosphoryl ethyl disulfide.

Ethoxy ethane phosphonyl propyl disulfide, methoxy propanethiophosphonyl methyl disulfide, ethoxy methylthiomethanethiophosphonyl octyl disulfide, cetyloxy hydroxymethanethiophosphonyl dodecylphenyl disulfide.

Bis-diethoxy thiophosphoryl disulfide, bis-cetyloxy thiophosphoryl disulfide, bis-ethoxy propylthio phosphoryl disulfide, diethoxy thiophosphoryl ethoxy propylthio phosphoryl disulfide, bis-diphenyloxy thiophosphoryl disulfide.

The acetylene reactants of the present invention have the formula:

$$R^5 - C \equiv C - R^4$$

wherein R⁴ and R⁵ can be hydrogen, a C₁ to C₃₀ organic radical such as hydrocarbyl, hydrocarbyloxy, hydrocarbylthio, carbohydrocarbyloxy, or halogen; preferably hydrogen or a C₁ to C₁₂ organic radical such as hydrocarbyl, substituted hydrocarbyl, alkoxy, alkylthio or carboalkoxy. Most preferably, R⁵ is hydrogen while R⁴ is C₁ to C₄ alkyl, phenyl or C₆ to C₈ substituted phenyl. In general, it is advantageous to use monosubstituted rather than disubstituted acetylene compounds.

The organic radicals are more preferably C₁ to C₄ hydroxyalkyl, ketoalkyl, carboalkoxy, alkyloxyalkyl, alkoxy, chloroalkyl, bromoalkyl, and cyanoalkyl.

Examples of acetylene reactants include: Acetylene, methylacetylene, ethylacetylene, dimethylacetylene, octylacetylene, cetylacetylene, isopropylacetylene, tricosylacetylene, methyl hexadecyl acetylene, diisopentylacetylene, 1,9-decadiyne, 1,5-hexadiyne, 1-hexen-5-yne, 1-decene-4-yne, 3-cyclohexyl 1-propyne, 1-7,-cyclotridecadiyne, 1,8,15,22-tricosatetrayne, phenylacetylene, 1-phenyl-1-propyne, 1-phenyl-1-nonyne, 4-phenyl 1-butyne, propargyl chloride, 1-chloro-4-decyne, 1,4-dichloro-2-butyne, propargyl bromide, chlorophenylacetylene, propargyl cyanide, propargyl alcohol, 3-butyn-1-ol, 2-decyn-1ol, diidopropyl ethynyl carbinol, 3-methyl-1-dodecyn-3-ol, 3-methyl-1-heptyn-6-en-3-ol, 4-phenyl-3-butyn-2ol, 1,3-diphenyl 1-butyn-3-ol, 1-phenyl-2-(1-hydroxycyclopentyl) acetylene, 1-ethynyl-1-cyclohexanol 3-hexyn-2, 5-diol, methyl propiolate, diethyl acetylene dicarboxylate, propargyl acetate, 2-butynediol diacetate, ethyl stearolate, ethoxyacetylene, methylthioacetylene, butyndiol dimethyl ether, phenyl propargyl aldehyde diethylacetal, 3-butynone, acetyl phenylacetylene, etc.

The phosphoryl disulfide reactants of the present invention can be advantageously prepared by known methods described in Volume 12 of the series entitled "Methoden der Organischen Chemie", written by K. Sasse, edited by E. Muller, published by G. Thieme Verlag, Stuttgart, W. Germany, Part 1 in 1963, Part 2 in 1964. Basically, these methods react a sulfenyl chloride with a thiol compound, to obtain unsymmetrical disulfides; or oxidize a thiophosphorus acid to the corresponding symmetrical phosphoryl disulfide.

Most of the acetylene reactants are commercially available as laboratory chemicals. A few may have to be prepared by known methods of synthesis.

It was found that the addition of phosphoryl disulfides occurs by a free radical mechanism. The initiation of the additions occurs by forming free thio radicals, preferably through the use of radiation and/or chemical initiators:

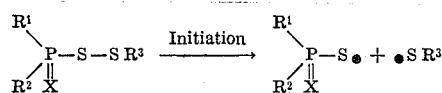

Radiation for radical type initiation include ultraviolet light, visible light, gamma irradiation and heat. Chemical free radical initiators include peroxides and axo compounds such as di-t-butyl peroxide, t-butyl hydroperoxide, benzoyl peroxide, perbenzoic acid, perborates, dichlorobenzoyl peroxide, axo-bis-i-butyronitrile.

The addition occurs selectively, by a free radical chain mechanism so as to form the corresponding monoadduct. The overall reaction generally is the following:

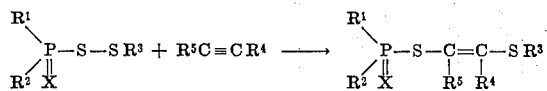

It was surprisingly found that the addition of unsymmetrical phosphoryl disulfides to unsymmetrical acetylenes occurs in a highly selective manner.

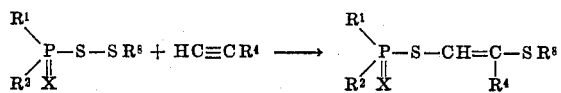

Since unsymmetrical disulfides are known to disproportionate to yield the corresponding symmetrical compounds, one would expect the adducts derived from these disulfides and the unsymmetrical disulfide adduct of a different orientation as well:

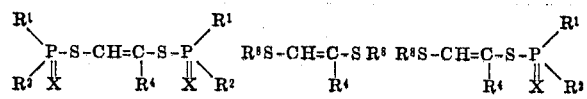

It was surprising to find that the major product of addition, in excess of 50 percent, was the unsymmetrical adduct of specific orientation.

The formation of the unsymmetrical adduct can be explained by the following mechanism.

In the first propagation step, the more stable phosphorylthio radical is added to the acetylene so as to form the most stable vinylic radical. In the second propagation step, the vinylic radical abstracts the less stable thio radical to selectively form a monoadduct of specific structure.

For example, the addition of diorgano phosphoryl (phosphoryl, phosphonyl, and phosphinyl) hydrocarbyl disulfides to monosubstituted acetylenes occurs in the following manner to yield primary S-vinylic esters of diorgano thiophosphorus acids:

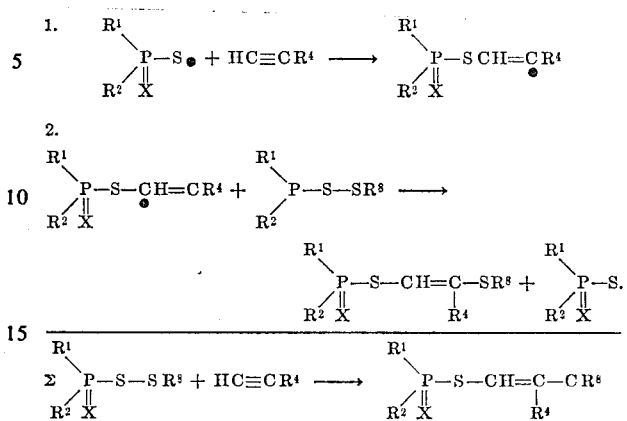

In the above reaction scheme, $R^1$ and $R^2$ represent $C_1$ to $C_{30}$ organic radicals. Preferred radicals for $R^1$ and $R^2$ are the same as given earlier. X stands for sulfur or oxygen, preferably for sulfur. $R^8$ represents a $C_1$ to $C_{30}$ organic radical, preferably a $C_1$ to $C_{30}$ hydrocarbyl radical or substituted hydrocarbyl radical. $R^8$ is more preferably a $C_1$ to $C_{12}$ hydrocarbyl radical or a $C_1$ to $C_{12}$ monosubstituted hydrocarbyl radical. Most preferably $R^8$ is a $C_1$ to $C_4$ alkyl group, a $C_1$ to $C_4$ monosubstituted alkyl group, phenyl or a $C_6$ to $C_8$ substituted phenyl.

The rate of the free radical reaction, once initiated does not depend appreciably on the temperature. The additions can be preferably carried out from $-100°$ to $+150°$ C., more preferably between $-50°$ to $+125°$ C.; most preferably, between $0°$ and $80°$ C. The lower limit of the reaction temperature is usually determined by the freezing point of the reaction mixture. In the case of chemical initiators, the reaction is carried out at temperatures high enough for a desirable rate of initiating radical generation.

In general, the additions are carried out under atmospheric pressure. However, under special circumstances, superatmospheric pressures may be preferable to keep the reaction mixture in the liquid reaction phase. For example, the use of a very low boiling Freon type solvent may logically lead to the use of pressure. In any case, the pressure used is preferably under 5 atmospheres.

Preferably, the additions are carried out in the liquid phase. In the case of solid reactants and/or low reaction temperatures, the use of solvents may be preferred to assure a homogeneous, liquid reaction mixture. Any solvent can be used which will not interfere with the initiation and propagation of the reaction. Suitable solvents include alcohols, such as methanol, t-butanol; ketones such as acetone and methyl isobutyl ketone; esters such as ethyl acetate and triethyl phosphate; ethers such as diethyl ether and dimethyl sulfide; hydrocarbons such as cyclohexane and butylene; and chlorinated hydrocarbons such as chlorobenzene. An excess of one of the reactants may also be used as a solvent.

The addition is largely independent of ratio of the reactants. Close to equimolar ratios are, however, preferred. It is preferable to limit the variation of the phosphoryl disulfide acetylene ratio between 10 to 0.1, more preferably 5 to 0.2 and most preferably between 3 to 0.3.

The monoaddition reactions proceed well under the conditions discussed to yield substantial amounts of the S-vinylic thio phosphorus esters largely free from by-products. The rate of the additions is usually sharply reduced with increasing reactant conversions. The reaction is usually run to a minimum of 20 percent conversion. It may be decided to discontinue the reaction after a 50 or 80 percent level of conversion has been reached.

The reaction time necessary to achieve the desired conversion is largely dependent on the intensity of the irradiation and/or the amount of the initiator used. Long irradiation periods with weak sources may be preferred in the laboratory. Under these conditions, reaction times may vary from 6 to 200 hours. In production, more intense initiation for a shorter time, e.g., between 30 minutes to 24 hours, is preferred. Using irradiation, continuous production techniques are also feasible.

The addition products are usually liquids; as are the reactants. They are usually separated by distillation in vacuo after the removal of acidic by-products. The monoesters can usually be distilled without decomposition. For the separation of diesters, adsorption chromatography may be preferred.

The adducts of the claimed monoadditions to mono- and disubstituted acetylenes are novel compositions, which can be represented by the following general formula:

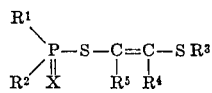

a. wherein X is sulfur and oxygen,
b. $R^1$ and $R^2$ represent a $C_1$ to $C_{30}$ organic radical, preferably a saturated, olefinic or aromatic hydrocarbyl, hydrocarbyloxy or hydrocarbylthio group or its monosubstituted derivative. More preferably, $R^1$ and $R^2$ can be $C_1$ to $C_{12}$ organic radicals such as saturated or aromatic hydrocarbyl, hydrocarbyloxy or hydrocarbylthio groups or monosubstituted derivatives thereof. Most preferably, $R^1$ and $R^2$ can be $C_1$ to $C_4$ alkyl, alkyloxy, alkylthio and their monosubstituted derivatives, phenyl and $C_6$–$C_8$ phenyl derivatives.
c. $R^3$ represents a $C_1$ to $C_{30}$ organic radical; preferably a saturated, olefinic or aromatic hydrocarbyl radical or its substituted derivative; an acyl radical such as a diorgano phosphoryl radical; a xanthyl group, an acyl radical derived from an aliphatic or aromatic carboxylic acid. More preferably $R^3$ can be a $C_1$ to $C_{12}$ organic radical such as a saturated or aromatic hydrocarbyl radical and derivatives thereof; a diorgano phosphoryl radical, a xanthyl radical, and a carboxylic acid derived acyl radical. Most preferably, $R^3$ is a $C_1$ to $C_4$ alkyl group, phenyl, $C_6$–$C_8$ substituted phenyl, $C_1$ to $C_4$ xanthyl, acetyl, benzoyl, $C_7$ to $C_9$ substituted benzoyl, or $C_1$ to $C_4$ diorgano phosphoryl.
d. $R^4$ represents a $C_1$ to $C_{30}$, preferably a $C_1$ to $C_{12}$, organic radical; preferably a saturated, olefinic or aromatic hydrocarbyl radical or its monosubstituted derivative, or halogen. More preferably $R^4$ is a $C_1$ to $C_{12}$ organic hydrocarbon radical selected from the group consisting of saturated aliphatic and phenyl radicals and their derivatives. Most preferably, $R^4$ is a $C_1$ to $C_4$ organic radical of saturated aliphatic character, such as chloromethyl, cyanomethyl, methylthiomethyl, phenyl and $C_6$ to $C_8$ substituted phenyl.
e. $R^5$ is as previously defined for $R^4$. It is, however, more preferable that $R^5$ be hydrogen.

More particularly, the new compostions include compounds represented by the following formula:

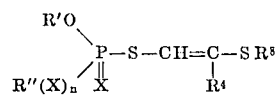

wherein $R'$ and $R''$ are $C_1$ to $C_{12}$ hydrocarbyl, preferably $C_1$ to $C_4$ alkyl or substituted alkyl; X is sulfur or oxygen, n is 1 or 0; $R^8$ is a $C_1$ to $C_{12}$ hydrocarbyl or substituted hydrocarbyl or acyl radical, preferably $C_1$ to $C_4$ alkyl, phenyl, $C_6$ to $C_8$ substituted phenyl, $C_1$ to $C_4$ xanthyl, acetyl, benzoyl or $C_7$ to $C_9$ substituted benzoyl radicals of the formula

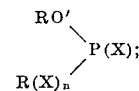

$R^4$ is $C_1$ to $C_{12}$ hydrocarbyl or substituted hydrocarbyl, preferably $C_1$ to $C_4$ unsubstituted or monosubstituted alkyl, phenyl or $C_6$ to $C_8$ substituted phenyl.

Another particular type of a composition within the scope of this invention is represented by the following formula:

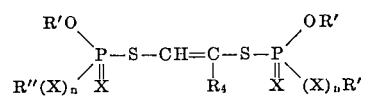

wherein $R'$ and $R''$ can be a $C_1$ to $C_{12}$ hydrocarbyl, preferably $C_1$ to $C_4$ alkyl group; X is sulfur or oxygen; $n$ is 1 or 0; $R^4$ is hydrogen, a $C_1$ to $C_{12}$ organic radical preferably a $C_1$ to $C_{12}$ organic radical selected from the group consisting of unsubstituted and monosubstituted saturated alkyl, and phenyl and substituted phenyl radicals. Most particularly, the following type of composition is preferred:

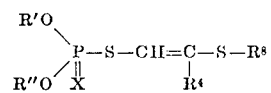

wherein $R'$ and $R''$ stand for $C_1$ to $C_{12}$ hydrocarbyl preferably $C_1$ to $C_4$ alkyl groups, X is sulfur or oxygen, $R^8$ is a $C_1$ to $C_{12}$ hydrocarbyl, preferably $C_1$ to $C_4$ alkyl, $R^4$ is a $C_1$ to $C_{12}$ hydrocarbyl or substituted hydrocarbyl preferably a $C_1$ to $C_4$ alkyl, $C_1$ to $C_4$ monosubstituted alkyl, phenyl, $C_6$–$C_8$ substituted phenyl.

Among the particularly claimed compositions is the following:

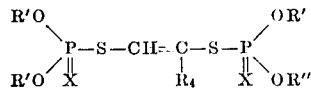

wherein $R'$ and $R''$ stand for $C_1$ to $C_{12}$ hydrocarbyl preferably $C_1$ to $C_4$ alkyl, preferably $C_1$ to $C_2$ alkyl; X is sulfur or oxygen; $R^4$ can be H, $C_1$ to $C_4$ alkyl, $C_1$ to $C_4$ monosubstituted alkyl, phenyl and $C_6$ to $C_8$ substituted phenyl. Most preferably, $R^4$ is hydrogen or methyl.

Most specifically, the following compositions are claimed:

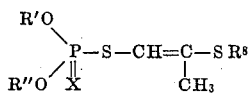

wherein R' and R" are methyl and ethyl, X is sulfur or oxygen, preferably sulfur; R³ is $C_1$ to $C_4$ alkyl.

Nonlimiting examples of S-vinylic thiophosphorus ester compositions include, e.g.: α, β -dimethyl β-methylthiovinyl dicetyl dithiophosphate, α, β-dicarbethoxy β-trichlorophenylthiovinyl diphenyl thiophosphate, β-dodecylthiomethyl β-cetylthiovinyl diethylhexyl dithiophosphate, β-carbooctoxy β-dodecylphenylthiovinyl methyl i-propyl dithiophosphate, β-chloromethyl β-butylthiovinyl-0-ethyl methylthiomethanedithiophosphonate, β-hexyl β-hydroxypropylthiovinyl 0-dodecyl propanedithiophosphonate, β-chlorophenyl β-carboethoxyethylthiovinyl diphenyl dithiophosphinate, β-cyclohexylmethyl β-hydroxyethylthiovinyl dicetyl dithiophosphinate, β-cetyl β-benzylthiovinyl dodecyl phenyl thiophosphinate, α, β-hydroxymethyl methylsulfonylphenylthiovinyl 0-tricosyl propyloxymethanethiophosphonate, ethylthiovinyl 0-ethyl S-n-propyl thiophosphate, butyl 1,2-bis-diethoxythiophosphoryl ethylene, 1,2-bis-ethoxy-propylthio thiophosphoryl ethylene, 1,2-bis dodecylphenyl thiophosphinyl propylene, 1,2-bis-ethoxy methanethiophosphonyl butylene.

While the above compositions are all novel and can be prepared by the process of this invention, they have widely different properties. Their pesticidal effectiveness is different. For economical use as pesticides certain novel compositions are preferred.

It is preferred for economic purposes that the molecular weight of the present S-vinylic esters of diorgano thiophosphorus acids be limited. It should be preferably less than 800 more preferably, less than 400. The organic moiety of the diorgano thiophosphorus acid is preferably ethyl, methyl, methoxy, ethoxy, and n-propylthio. The α-carbon of the vinylic group is preferably unsubstituted while the β-carbon should bear only substituents of very limited weight. One of the β-substituents is advantageously a $C_1$ to $C_4$ alkyl group while the other is a $C_1$ to $C_4$ alkylthio group. Low molecular weight dialkyl thiophosphoric, alkyl alkanethiophosphonic acid S-alkylthiovinyl esters are highly polar and as such are taken up into the plant sap, i.e., they act as systemic pesticides.

In general, the new pesticidal compositions have an outstandingly broad pesticidal spectrum. This property is particularly important from the viewpoint of their industrial development since their wide spectrum allows their application for the protection of a number of important crops. The vinylic thio acid esters of this invention are particularly useful as insecticides against a number of important insect pests.

When used as pesticides, the biologically active ingredients of this invention are preferably formulated with a suitable carrier or diluent or combinations thereof.

The term "carrier" or "diluent" as used herein means a material, which can be inorganic or organic and synthetic or of natural origin, with which the active ingredient of this invention can be mixed or formulated to facilitate its storage, transportation, handling, and application to the insects to be treated. The carrier is preferably biologically and chemically inert, and, as used, can be a solid or a fluid. When solid carriers are used, they are preferably particulate, granular, or pelleted; however, other shapes and sizes of solid carriers can be employed as well. Such preferably solid carriers can be naturally occurring materials, although subsequently subjected to grinding, sieving, purification, and/or other treatments — including for example, gypsum; tripolyte; diatomaceous earth, mineral silicate; such as mica, vermiculite, talc, and pyrophyllite; clays of the montmorillonite, kaolinite, or attapulgite groups; or calcite and dolomite; etc. Carriers produced synthetically, as for example, synthetic hydrous silica oxides and synthetic silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the active ingredient.

For some purposes, a resinous or waxy carrier can be used, preferably one which is solvent; soluble or thermoplastic, including fusible. Examples of such carriers are natural or synthetic resins such as coumarin; rosin; resin; copal; shellac, dammar; polyvinyl chloride; styrene polymers and copolymers; a solid grade of polychlorophenol such as is available under the registered trademark "Arochlor"; a bitumen; an asphaltite, a wax, for example, beeswax; or a mineral wax such as paraffin wax or Montan Wax; or a chlorinated mineral wax; or a microcrystalline wax such as those available under the registered trademark "Microvan Wax." Compositions comprising said resinous or waxy carriers preferably are in granular or pelleted form.

Fluid carriers can be liquids, as, for example, water, or an organic fluid, including a liquefied normally vaporous or gaseous material, and can be solvents or nonsolvents for the active material. For example, the horticultural petroleum spray oils boiling in the range of from about 275° to about 575° F., or boiling in the range of from about 575° to about 1,000° F. and having an unsulfonatable residue of at least about 75 percent and preferably of at least about 90 percent, or mixures of these two types of oils are particularly suitable liquid carriers.

The carrier can be mixed or formulated with the active material during its manufacture or at any stage subsequently. The carrier can be mixed or formulated with the active material in any proportion depending upon the nature of the carrier. One or more carriers, moreover, can be used in combination.

The compositions of this invention can be concentrated, suitable for storage and transport, and contain, for example, from about 5 to about 95 percent by weight of the active ingredient, preferably from about 20 to about 80 percent by weight. These concentrates can be diluted with the same or different carrier to a concentration suitable for application. The compositions of this invention can also be dilute compositions suitable for application. In general, concentrations of about 0.1 to about 10 percent by weight of the active material, based upon the total weight of the composition, are satisfactory, although lower and higher concentrations can be applied if necessary.

The compositions of this invention can also be formulated as dusts. These comprise an admixture of the active ingredient and a finely powdered solid carrier such as aforedescribed. The powdered carriers can be oil-treated to improve adhesion to the surface to which they are applied. These dusts can be concentrated, in which case a highly sorptive carrier is preferably used. These require dilution with the same or different finely powdered carrier, which can be of lower sorptive capacity to a concentration suitable for application.

The compositions of this invention can also be formulated as wettable powders comprising a major proportion of the active ingredient mixed with a dispersant, i.e., a deflocculating or suspending agent, and, if desired, a finely divided solid carrier and/or a wetting agent. A reactive ingredient can be in particulate form or adsorbed on the carrier and preferably constitutes at least about 10 percent, more preferably at least about 35 percent by weight of the final pesticidal composition. The concentration of the dispersing agent should in general be between about 0.5 and about 5 percent by weight of the total composition, although larger or smaller amounts can be used if desired.

The dispersing agent used in the composition of this invention can be any substance having definite dispersant, i.e., deflocculating or suspending properties as distinct from wetting properties, although the substances can also possess wetting properties as well.

The dispersant or dispersing agent used can be protective colloids such as gelatin, glue, casein, gums, or a synthetic polymeric material such as polyvinyl alcohol, methyl cellulose, etc. Preferably, however, the dispersants or dispersing agents used are sodium or calcium salts of high molecular weight sulfonic acids, as for example, the sodium or calcium salts of lignin sulfonic acid derived from sulfite cellulose waste liquors. The calcium or sodium salts of condensed aromatic sulfonic acids, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum oil fractions with alkylene oxide such as ethylene oxides or propylene oxides, or with both ethylene oxide and propylene oxide, as, for example, the condensation product of oleic acid and ethylene oxide containing about 6 to 15 ethylene oxide units in the molecule. Other non-ionic wetting agents like polyalkylene oxide polymers, commercially known as "Pluronics," can be used. Partial esters of the above acids with polyhydric alcohols such as glycerol, polyglycerol, sorbitol, mannitol, etc., can also be used.

Suitable anionic wetting agents include the alkali metal salts, preferably sodium salts of sulfuric acid half esters or sulfonic acids containing at least 10 carbon atoms in a molecule, for example, the sodium secondary akyl sulfates, dialkyl sodium sulfosuccinates available under the registered trademark "Teepol," sodium salt of sulfonated castor oil, sodium dodecyl benzene sulfonate, etc.

Granulated or pelleted compostions comprising a suitable carrier having the active ingredient incorporated therein are also included in this invention. These can be prepared by impregnating a granular carrier with a solution of an active ingredient or by granulating a mixture of a finely divided carrier and the active ingredient. The carrier used can contain a fertilizer or a fertilizer mixture, such as, for example, a superphosphate.

The compositions of this invention can also be formulated as solutions of the active ingredient in an organic solvent or mixture of solvents, such as, for example, alcohols; ketones, especially acetones; ethers; hydrocarbons; etc.

The liquid toxicants of this invention can be sprayed upon the insects without further dilution.

Petroleum hydrocarbon fractions used as solvents should preferably have a flash point of about 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredient in an organic liquid, preferably a water-insoluble organic liquid containing an added emulsifying agent. These concentrates can also contain a proportion of water, for example, 50 percent by volume, based upon the total composition to facilitate the solution with water. Suitable organic liquids include, e.g., the above petroleum hydrocarbon fractions previously described.

The emulsifying agents are generally of the type producing water-in-oil type emulsions which are suitable for applications by low volume spraying, or an emulsifier of the type producing oil-in-water emulsions. Oil-in-water emulsions can be used, producing concentrates which can be diluted with relatively large volume of water for application by high volume spraying or relatively small volumes of water for low volume spraying. In such emulsions, the active ingredient is preferably in a nonaqueous phase.

The present invention is further illustrated in further detail by the following examples, but it is to be understood that the present invention, in its broadest aspects, is not necessarily limited in terms of the reactants or specific temperatures, residence times, separation techniques, and other process conditions, etc.; or dosage levels, exposure times, test insects used, etc. by which the compounds and/or formulations described and claimed are prepared and/or used.

EXAMPLE 1 — Addition of 0,0'-Diethoxy Thiophosphoryl Hydrocarbyl Disulfides to Acetylenes with Ultraviolet Light Initiation The diethoxy thiophosphoryl hydrocarbyl disulfide reactant was charged into a heavy walled quartz tube equipped with a magnetic stirrer and a Teflon pressure valve. In the case of gaseous acetylenic reaction components, the tube was then evacuated and the acetylene was condensed. Liquid acetylenic reactants were simply added to the disulfide. The closed and stirred tube was then irradiated by two 75 watt Hanovia ultraviolet immersion lamps, each having a high pressure mercury arc emitting a wide spectrum radiation, from about 5 cm distance.

The progress of the reaction was followed by the periodic examination of samples by nuclear magnetic resonance spectroscopy (nmr). The S-vinylic ester products formed were estimated on the basis of the intensity of nmr signals in the vinylic hydrogen region.

The reaction mixtures were usually fractionally distilled in high vacuo to separate the products. The yields and the elemental analyses of the products are given in Table I.

TABLE I.—ADDITION OF DIALKOXYTHIOPHOSPHORYL ALKYL DISULFIDES TO METHYL ACETYLENE, PROPARGYLCHLORIDE AND ETHYL PROPIOLATE $$(CH_3CH_2O)_2P(=S)-S-S-R' + HC\equiv C-Z-(CH_3CH_2O)_2P(=S)-S-CH=C(-Z)-S-R'$$

R' = CH$_3$, CH$_3$CH$_2$, CH$_3$(CH$_2$)$_3$CH$_2$—⟨C$_6$H$_4$⟩—Cl

Z = CH$_3$, CH$_2$Cl, CO$_2$CH$_2$CH$_3$

| Structure of adduct | Reactants used, moles | | Irradiation time, hrs. | Conversion, percent | Yield, percent | BP., °C./mm. | Elemental composition, percent | | | | | | | |
|---|---|---|---|---|---|---|---|---|---|---|---|---|---|---|
| | | | | | | | Calculated | | | | Found | | | |
| | Disulfide | Acetylene | | | | | C | H | P | S | C | H | P | S |
| (CH$_3$CH$_2$O)$_2$P(=S)—S—CH=C(CH$_3$)—S—CH$_3$ | 0.15 | 0.21 | 70 | 50 | 28 | 92-96/0.03 | 37.84 | 6.29 | 11.39 | 37.87 | 34.02 | 6.36 | 11.58 | 36.83 |
| (CH$_3$CH$_2$O)$_2$P(=S)—S—CH=C(CH$_3$)—S—CH$_2$CH$_3$ | 0.14 | 0.32 | 67 / 48 / 24 | 83 / 77 / 45 | 65 | 103-108/0.15-0.20 | 37.70 | 6.68 | 10.84 | 33.59 | 37.45 | 6.98 | 10.84 | 34.96 |
| (CH$_3$CH$_2$O)$_2$P(=S)—S—CH=C(CH$_3$)—S CH$_2$CH$_2$CH$_2$CH$_2$CH$_3$ | 0.15 | 0.22 | 70 / 48 | 33 / 28 | 26 | 98-100/0.04 | | | 9.85 | 30.59 | | | 10.70 | c33.44 |
| (CH$_3$CH$_2$O)$_2$P(=S)—S—CH=C(CH$_2$Cl)—S—CH$_2$CH$_3$ | 0.01 | 0.1 | 40 | 33 | a36 | | 31.71 | 5.65 | 9.65 | 29.97 | 33.38 | 5.39 | 10.25 | c32.83 |
| (CH$_3$CH$_2$O)$_2$P(=S)—S—CH=C(CO$_2$CH$_2$CH$_3$)—S—CH$_3$ | 0.05 | 0.1 | 72 / 65 / 17 | 30 / 13 | 33 | 100-104/0.06 | | | 9.38 | 29.01 | | | 10.12 | c33.66 |
| (CH$_3$CH$_2$O)$_2$P(=S)—SCH=C(—C$_6$H$_4$—Cl)—S—CH$_3$ | 0.19 | 0.66 | 23 | 80 | a,b100 | | 42.34 | 4.92 | 6.39 | 8.3 | 44.41 | 4.81 | 7.47 | | a Yield is based on the weight of the distillation residue obtained after the removal of the starting materials. Product could not be distilled without decomposition.
b Only methylacetylene could be removed from the crude reaction product.
c After a low level of conversion, all the unreacted disulfide could not be removed by distillation. This resulted in high P and S analyses for the residual product.

The strongest support for the structure of the monoadducts could be obtained by nmr spectroscopy. The nmr data are summarized in Table II. The signals of the vinyl protons and of the protons of the vinylic substituents were most helpful in recognizing and estimating the total monoadducts. Furthermore, the signals of the cis- and of the trans-vinylic protons could be also distinguished here. The relative intensity of these signals indicated that the monoadducts of cis-configuration, as for example,

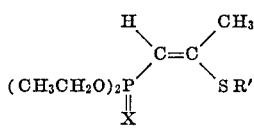

are the major isomer.

EXAMPLE 2 — Addition of Diethoxy Thiophosphoryl Ethyl Disufide to Acetylene

In a mixture of 24 g. (0.0975 mole) of diethoxy thiophosphoryl disulfide and 10 g. of acetone contained in a quartz pressure tube, 3.9 g. (0.15 mole) of acetylene was dissolved at 50° C. The tube was then closed and irradiated at 15° C. as in the previous example.

Nmr indicated that in 24 hours about 28 percent of the disulfide reacted. During the total irradiation period of 112 hours, 50 percent reaction took place.

After the removal of the acetylene and the acetone in vacuo, the crude residual product was dissolved in 200 ml ether, washed with 50 ml 5 percent aqueous sodium hydrogen carbonate solution and dried over anhydrous sodium sulfate. Fractional distillation of the ether solution in vacuo yielded 12 g. (45 percent) of S-2-ethylthiopropenyl diethyl dithiophosphate as a yellow liquid, distilling between 93°–95° C. at 0.1 mm. The expected structure of the adduct was confirmed by its nmr spectrum.

Elemental Analyses: Calculated for $C_7H_{15}O_2PS_2$: C, 32.54; H, 5.85; P, 11.99. Found: C, 33.47; H, 6.06; P, 11.93.

EXAMPLE 3 — Addition of 0,0'-Diethoxy Phosphoryl Alkyl Disulfides to Methylacetylene with Ultraviolet Light Initiation To the diethoxy phosphoryl alkyl disulfide reactant in a quartz tube, methylacetylene was condensed in a dry ice-isopropanol bath. The tube was then closed and the stirred contents irradiated as in the previous example.

The reaction conversions, product yields and the results of elemental analyses are given in Table III.

EXAMPLE 4 — Addition of Diethoxy Thiophosphoryl Ethyl Disulfide to Phenylacetylene with t-Butyl Peroxide Initiation.

Into a 250 ml. two necked flask equipped with a magnetic stirrer, condenser attached to a drying tube and a thermometer, was charged 24.7 g. (0.1 mole) of diethoxy thiophosphoryl ethyl disulfide, 13.6 g. (0.13 mole) of phenyl acetylene and 0.45 g. (0.003 mole) of t-butyl peroxide. The reaction mixture was heated to 125° C. and kept there for 6 hours. The progress of the reaction was followed by nmr which gave the following results:

| Conversion, % | Time, Minutes |
|---|---|
| 61 | 85 |
| 70 | 205 |
| 75 | 265 |
| 80 | 360 |

The crude reaction product was then heated under 0.2 mm pressure at 50° C. to remove the unreacted phenylacetylene. The remaining product was a mixture of 80 mole percent adduct and 20 mole percent disulfide. NMR showed a multiplet between 6.98 and 7.72 ppm for the five aromatic protons, a set of two doublets centered at 6.58 ppm for the cis-and trans-vinylic proton in the ratio of 5 to 2 and having coupling constants (J) of 12 and 11 cps, respectively. The methylenoxy protons showed up between 2.19 and 3.16 ppm as a complex multiplet; the adjecent methyl protons and the methyl protons of the ethylthio group exhibited two overlapping triplet with coupling constants of 7 cps in the region between 1.08 and 1.62 ppm. Finally, the S-methylene protons gave a broad multiplet between 2.19 and 3.16 ppm.

EXAMPLE 5 — Addition Dimethoxy Phosphoryl and Thiophosphoryl Disulfides to Acetylenes with Ultraviolet Light Initiation Mixtures of the appropriate dimethoxy phosphoryl disulfide and acetylene were reacted in the manner described under Example 1.

After the desired reaction conversion was reached, the unreacted acetylene was removed in vacuo. The residual product was identified by nmr. The conversions and the nmr parameters are given in Table IV.

TABLE II.—PROTON MAGNETIC RESONANCE SPECTRA OF THE ADDUCTS OF DIALKOXYPHOSPHORYL AND DIALKOXYTHIOPHOSPHORYL ALKYL DISULFIDES WITH METHYL-ACETYLENE, PROPARGYL CHLORIDE AND ETHYL PROPIOLATE $$(CH_3CH_2O)_2\overset{\|}{\underset{S}{P}}-S-SR' + HC\equiv C-Z \longrightarrow (CH_3CH_2O)_2\overset{\|}{\underset{S}{P}}-S-CH=C-S-R' \quad R'=CH_3,\ CH_2CH_3,\ CH_2CH_2CH_3,\ \text{—}\underset{Z}{\overset{}{\bigcirc}}\text{—Cl}$$
$$Z=CH_3,\ CH_2Cl,\ CO_2CH_2CH_3$$

Chemical shifts of structural fragments of adduct, p.p.m. and coupling constant (cps).
[In ca. 30% $CCl_4$, downfield from $(CH_3)_4Si$]

| Structure of adduct | $CH_3$—$CH_2$ [a] | | —$CH_2$—O—P— [b] | | —$CH=C$ | | | —$C=C$—$Z$ | | —S—R [c] |
|---|---|---|---|---|---|---|---|---|---|---|
| | Cis | Trans (J) | Cis | Trans | Cis | (J) | Trans | (J) | Cis | Trans | |
| $(CH_3CH_2O)_2\overset{\|}{\underset{S}{P}}SCH=C-SCH_3$<br>　　　　　　　　$\|$<br>　　　　　　　　$CH_3$ | 1.37 | (7.0) | 3.85 | 4.47 | 5.42 | (7.5) | 5.91 | (9.0) | 2.00 | [b] 2.2 | 2.31s and 2.40s. |
| $(CH_3CH_2O)_2\overset{\|}{\underset{S}{P}}SCH=C-SCH_2CH_3$<br>　　　　　　　　$\|$<br>　　　　　　　　$CH_3$ | 1.36 | (7.0) | 3.83 | 4.42 | 5.59 | (8.0) | 6.0 | (11.0) | 1.84 | [b] 2.14 | 1.31t ($CH_3$—$CH_2$, J 7.0); 2.78q ($CH_3$—$CH_2$, J 7.1). |
| $(CH_3CH_2O)_2\overset{\|}{\underset{S}{P}}SCH=C-SCH_2CH_2CH_3$<br>　　　　　　　　$\|$<br>　　　　　　　　$CH_3$ | 1.40 | (7.0) | 3.95 | 4.61 | 5.70 | (8.0) | 6.13 | (11.5) | 2.00 | [b] 2.22 | 1.00t ($CH_3$—$CH_2$, J 6.0); Ca. 1.52[b] ($CH_3$—$CH_2CH_2$—$CH_2$—S); 2.81t ($CH_2$—$CH_2$—S, J 6.0). |
| $(CH_3CH_2O)_2\overset{\|}{\underset{S}{P}}SCH=C-S$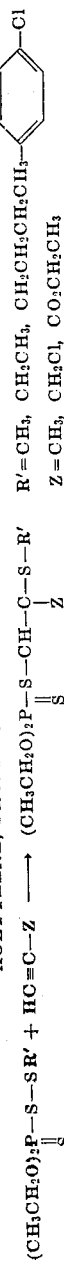<br>　　　　　　　　$\|$<br>　　　　　　　　$CH_3$ | 1.35 | (7.0) | 3.79 | 4.50 | 6.00 | (8.5) | [b] 6.3 | ------ | 1.82 | [b] 2.30 | 7.28s. |
| $(CH_3CH_2O)_2\overset{\|}{\underset{S}{P}}SCH=C-SCH_2CH_3$<br>　　　　　　　　$\|$<br>　　　　　　　　$CH_2Cl$ | 1.41 | (7.0) | 3.90 | 4.60 | 6.12 | (10.0) | 6.90 | (12.0) | 3.90 | t 4.60 | 1.45t ($CH_3CH_2$—, J 7.0); 2.92q ($CH_3CH_2$—, J 7.0). |
| $(CH_3CH_2O)_2\overset{\|}{\underset{S}{P}}SCH=C-SCH_3$<br>　　　　　　　　$\|$<br>　　　　　　　　$CO_2CH_2CH_3$ | 1.40 | (8.0) | 3.98 | 4.68 | 7.00 | (20.0) | 8.00 | (15) | 1.40[a] ($CH_3CH_2$, J 8) t ($CH_3CH_2$) | | 2.40s and 2.48s. |

[a] Triplet centered at δ value given.
[b] Complex multiplet.
[c] s=singlet, d=doublet, t=triplet, q=quadruplet.
[e] Appears as ill-defined doublet due to splitting by phosphorous (J=7-10) and additional splitting by Z (J=ca. 0.5-2.0 cps). δ Value given is for center of doublet.
[f] Overlaps with methoxy protons of phosphorus ester groups.

TABLE III.—ADDITION OF DIALKOXYPHOSPHORYL ALKYL DISULFIDES TO METHYLACETYLENE

| Structure of adduct | Reactants (moles) | | Irradiation time, hrs. | Conversion, percent | Yield, percent | B.P., °C./mm. | Elemental composition | | | | | | | |
|---|---|---|---|---|---|---|---|---|---|---|---|---|---|---|
| | | | | | | | Calculated | | | | Found | | | |
| | Disulfide | Acetylene | | | | | C | H | P | S | C | H | P | S |
| $(CH_3CH_2O)_2\overset{\|}{\underset{O}{P}}SCH=C-SCH_3$<br>　　　　　　　$\|$<br>　　　　　　　$CH_3$ | 0.1 | 0.5 | 312 | 60 | 30 | 98-100/.05 | 37.49 | 7.64 | 13.83 | 14.29 | 33.44 | 6.59 | 12.68 | 26.27 |
| $(CH_3CH_2O)_2\overset{\|}{\underset{O}{P}}SCH=C-SCH_2CH_3$<br>　　　　　　　$\|$<br>　　　　　　　$CH_3$ | 0.28 | 0.59 | 70<br>23 | 56<br>53 | 34 | 98-100/0.05 | 39.98 | 7.08 | 11.45 | 23.72 | 30.44 | 6.92 | 10.91 | 23.73 |
| $(CH_3CH_2O)_2\overset{\|}{\underset{O}{P}}SCH=C-SCH_2CH_2CH_3$<br>　　　　　　　$\|$<br>　　　　　　　$CH_3$ | 0.2 | 0.47 | 62 | 55 | 43 | 108/0.03 | 42.23 | 7.70 | 10.91 | 22.53 | 41.05 | 7.33 | 11.24 | 23.05 |

TABLE IV.—ADDITION OF DIMETHOXYPHOSPHORYL AND DIMETHOXYTHIOPHOSPHORYL DISULFIDE TO METHYLACETYLENE AND PROPARGYL CHLORIDE $$(CH_3O)_2\underset{X}{\underset{\|}{P}}-S-S-\underset{X}{\underset{\|}{P}}(OCH_3)_2 + HC\equiv C-CH_2-Y \longrightarrow (CH_3O)_2\underset{X}{\underset{\|}{P}}-S-CH=\underset{Y-CH_2}{C}-S-\underset{X}{\underset{\|}{P}}(OCH_3)_2 \quad X=O, S; Y=Y, Cl$$

| Structure of adduct | Reactants used, moles | | Irradiation time, hrs. | Conversion, percent | Chemical shifts of structural fragments of adduct, p.p.m. [in ca. 30% CCl₄, downfield from (CH₃)₄Si] | | | Coupling constant, cps. POCH₃ |
|---|---|---|---|---|---|---|---|---|
| | Disulfide | Acetylene | | | —CH=ᵃ | =C—CH₂—Y ᵇ | —O—CH₃ ᶜ | |
| (CH₃O)₂P(=O)—S—CH=C(CH₃)—S—P(=O)(OCH₃)₂ | 0.11 | 0.35 | 70 | 80 | 6.29–6.70 | 2.0–2.2 | 3.82 | 12.5 |
| (CH₃O)₂P(=S)—S—CH=C(CH₃)—S—P(=S)(OCH₃)₂ | 0.19 | 0.32 | 88 | 90 | 6.28–6.70 | 2.07–2.30 | 3.81 | 15.5 |
| (CH₃O)₂P(=O)—S—CH=C(CH₂Cl)—S—P(=O)(OCH₃)₂ | 0.075 | 0.160 | 117 | 90 | 6.70–7.40 | 4.32–4.80 | 3.85 | 7.5 |

ᵃ Broad multiplet in the region of.
ᵇ A series of overlapping doublets in the region.
ᶜ Doublet whose center is at δ value given.

EXAMPLE 6 — Addition of Diethoxy Phosphoryl and Thiophosphoryl Disulfide to Methylacetylene and Propargyl Chloride The additions were carried out as in the previous example. The results are shown in Table V.

methyl acetylene was irradiated as described in Example 1 for 172 hours. Subsequent analysis of the mixture by GLC indicated 20 percent disulfide conversion.

On fractional distillation of the mixture 6.2 g. of product was obtained between 90–97 percent at 0.1

TABLE V.—ADDITION OF DIETHOXYPHOSPHORYL AND DIETHOXYTHIOPHOSPHORYL DISULFIDE TO METHYLACETYLENE AND PROPARGYL CHLORIDE $$(CH_3CH_2O)_2\underset{X}{\underset{\|}{P}}-S-S-\underset{X}{\underset{\|}{P}}(OCH_2CH_3)_2 + HC\equiv C-CH_2Y \longrightarrow (CH_3CH_2O)_2\underset{X}{\underset{\|}{P}}-S-CH=\underset{Y-CH}{C}-S-\underset{X}{\underset{\|}{P}}(OCH_2CH_3)_2$$

$$X=O, S; \quad Y=H, Cl$$

| Structure of adduct | Reactants used, moles | | Irradiation time, hrs. | Conversion, percent | Chemical shifts of structural fragments of adduct, p.p.m. [in ca. 30% CCl₄, downfield from (CH₃)₄Si] | | | |
|---|---|---|---|---|---|---|---|---|
| | Disulfide | Acetylene | | | -CH=ᵃ | =C-CH₂-Y ᵇ | -O-CH₂- | (-CH₂)-CH₃ ᶜ |
| (CH₃CH₂O)₂P(=O)—S—CH=C(CH₃)—S—P(=O)(OCH₂CH₃)₂ | 0.29 | 0.81 | 71.5 / 23 | 74 / 44 | 6.32–6.68 | ᵇ 1.98–2.29 | 3.88–4.53 | 1.17–1.61 |
| (CH₃CH₂O)P(=S)—S—CH=C(CH₃)—S—P(=S)(OCH₂CH₃)₂ | 0.30 | 0.29 | 92 | 80 | 6.34–6.70 | ᵇ 2.08–2.26 | ᵇ 2.90–4.58 | 1.22–1.58 |
| (CH₃CH₂O)₂P(=S)—S—CH=C(CH₂Cl)—S—P(=S)(OCH₂CH₃)₂ | 0.05 | 0.05 | 40.5 | 50 | 5.95–6.41 | | ᵈ 3.90–4.65 | 1.20–1.60 |

ᵃ Broad multiplet in the region of.
ᵇ Multiplet in the region of.
ᶜ Coupling constant J CH₂CH₃ 7 cps.
ᵈ The multiplet signals of CH₂Cl and OCH₂ overlap in the region of.

EXAMPLE 7 — Addition of Diethoxy Thiophosphoryl Ethoxythiocarbonyl Disulfide to Methylacetylene To 56 g (0.2 mole) of diethoxy thiophosphoryl ethoxythiocarbonyl disulfide placed in a quartz pressure tube 29.8 g. (0.74 mole) of methyl acetylene was condensed. The closed, stirred reaction mixture was then irradiated at 15° C. for 77 hours.

After the removal of the excess methyl acetylene the nmr spectrum of the crude product indicated the presence of about 60 mole percent of the desired adduct and 40 mole percent of the starting disulfide. The characteristics product signals in the nmr spectrum originated from the vinyl proton, i.e., a broad ill defined multiplet in the region between 6.5 and 7.4 ppm, and from the vinylic methyl protons, i.e., a multiplet at 2.05 to 2.31 ppm. The diethoxy thiophosphoryl and the ethoxy thiocarbonyl signals of the starting disulfide and the adduct product could not be distinguished.

EXAMPLE 8 — Addition of O-Ethyl Ethanethiophosphonyl Ethyl Disulfide to Methylacetylene A mixture of 32 g. (0.14 mole) of O-ethyl ethane thiophosphonyl ethyl disulfide and 10.3 g. (0.26 mole) of methyl acetylene was irradiated as described in Example 1 for 172 hours. Subsequent analysis of the mixture by GLC indicated 20 percent disulfide conversion.

On fractional distillation of the mixture 6.2 g. of product was obtained between 90–97 percent at 0.1 mm. GLC indicated a purity of 50 percent for the product.

EXAMPLE 9 — ADdition 0-Ethoxy-S-n-Propyloxy Phosphoryl Ethyl Disulfide to Methylacetylene A mixture of one mole of the disulfide and two moles of methylacetylene is irradiated as in the previous example.

The crude product is then washed neutral and fractionally distilled in vacuo to yield the desired adduct, i.e., S-2-ethylthiopropenyl S'-n-propyl O-ethyl dithiophosphate, as a liquid boiling between 122°–130° at about 0.3 mm. The structure of the product is supported by its nmr spectrum.

EXAMPLE 10 — Addition of Cetyloxy Benzenethiophosphonyl 2,4,5-Trichlorophenyl Disulfide to Dodecyne with Gamma Ray Initiation Irradiation of equimolar quantities of the above disulfide and dodecyne in cyclohexane at 40° C. with gamma rays from a Co⁶⁰ source results in the formation of S-2-(2,4,5-trichlorophenylthio)-dodecenyl O-cetyl benzene dithiophosphonate.

EXAMPLE 11 — Addition of Diphenyl Thiophosphinyl Hexadecylphenyl Disulfide to Chlorophenyl-Acetylene with Dibutyl Peroxide Initiation Heating of equimolar quantities of the above disulfide and acetylene in the presence of 5 mole percent di-t-butyl peroxide at 120° C. for 6 hours results in the formation of S-(2-hexadecylphenyl)-chlorostyryl diphenyl dithiophosphinate.

Biological Testing of S-Vinylic Esters of Thiophosphorus Acids

The new S-vinylic esters of thiophosphorus acids were tested in the laboratory and in the greenhouse to determine their biological activity. Most of the testing was carried out on S-vinyl dialkyl mono- and dithiophosphates. A structurally related S-vinylic dithiophosphate composition which was disclosed in the prior art was also investigated side by side with the new compounds. Leading commercial compounds, namely Disyston and Systox, which are also structurally related were also used for comparative evaluations.

In the insecticidal and miticidal tests the experimental compounds were tested as aqueous emulsions. These emulsions were prepared by dissolving the compound in acetone and dispersing it in distilled water with Triton X-100, i.e., an alkyl aryl polyether alcohol, to give spray emulsions containing the desired concentrations of the compound. These emulsions were then used in standard laboratory tests as described in the following:

Mexican Bean Beetle Larvae — Bean leaves were dipped in the emulsion of the test chemical and allowed to dry. Individual treated leaves were placed in Petri dishes and four Mexican bean beetle larvae introduced into each of the two replicate dishes. Mortality determinations were made after 3 days.

Mites — Potted bean plants infested with the two-spotted spider mite were placed on a turntable and sprayed with a formulation of the test chemical. The plants were held for 5 days. The degree of mite control was rated after 2 days, the nymph control was estimated after 5 days.

Mites, Systemic — Bean plants infested with the two-spotted mites were treated by applying 20 ml of the formulated test chemical to the soil. Mortality evaluations were made after 2 and 5 days as in the contact test.

Aphid-Spray Test — A potted nasturtium plant infested with the bean aphids was placed on a turntable and sprayed with the same formulation. The plants were held for 48 hours before mortality determinations were made.

Aphid-Systemic Test — A nasturtium plant in a 2½ inch pot was infested with the bean aphid and was treated by applying 20 ml of a formulation of the test chemical to the soil. The plants were held for 48 hours, then mortality determinations were made as above.

House flies — Caged flies were sprayed with the formulated chemical. Control was evaluated 2 days later.

Corn Rootworm — This test was done in the soil with larvae 7–10 days old in the following manner. Seventy-five ml. (90–100 grams) of an air dried soil-sand (2:1) mixture was placed in an 8 ounce plasticized cup. Ten ml. of a 2.5 ppm stock equivalent to 0.25 ppm or 5 pounds in a 6-inch deep acre, was pipetted onto the surface of the soil. The cup was capped and one hour later it was shaken vigorously thirty times. The cap was removed and two very young corn plants and five larvae were introduced. Readings on mortality were made 5 days later.

Root-Knot Nematode — An air dried 2:1 soil-sand mixture (125 ml.) in an 8-ounce plasticized container was infested with a stock of root-knot nematode prepared 7–10 days previously (at the rate of 6–7 grams of chopped galls per gallon of soil). Ten ml. of the formulated test chemical at 231 ppm. was poured onto the surface of the soil-sand mixture to give a rate equivalent to 25 pounds per 6 inches per acre. The container was then capped and shaken vigorously 1 hour later. The container was kept for 5–7 days, then shaken again and seeded with four cucumber seeds by placing the seeds on the surface and covering with one-half inch of sand. After 3–4 weeks the roots were examined for galls and the degree of control determined.

Cholinesterase Inhibition Test

To a solution of 0.2 unit of bovine cholinesterase in 2.97 ml. of a buffer solution containing 11.15 grams of disodium hydrogen phosphate dodecahydrate and 1.81 grams of potassium dihydrogen phosphate per liter of water, 0.03 ml. of a solution of the test chemical in acetone was added. This mixture was then incubated in a water bath at 35° C. for 30 min. One ml. of a solution containing 100 milligrams of a cetylthiocholine iodide, and 75 ml. of the above buffer solution in sufficient water to make 200 ml. was then added and the mixture again incubated in a water bath at 35° C. for 30 minutes more. The amount of inhibition of bovine cholinesterase was then determined from the absorbance of this solution at 420 m$\mu$ (millimicron). By using a series of solutions of the test chemical at various concentrations in acetone, the concentration needed for 50 percent inhibition was determined to be $2.5 \times 10^{-5}$ M.

The insecticidal effectiveness of organophosphorus compounds is generally attributed to cholinesterase inhibition. Determination of the cholinesterase inhibition is widely used to estimate the insecticidal potential of new organophosphorus compounds.

EXAMPLE 12 — Comparative Pesticidal Testing of the Novel S-2-Ethylthiopropenyl and the Disclosed S-2-Ethylthiovinyl Diethyl Dithiophosphate The above compounds described in Examples 1 and 2 were tested side by side against a variety of pests at various concentrations. The mortalities observed are listed in Table VI.

TABLE VI.—COMPARATIVE PESTICIDAL ACTIVITY OF S-2-ETHYLTHIOPROPENYL AND S-2-ETHYLTHIOVINYL DIETHYL DITHIOPHOSPHATES

| Experimental chemical | | Conc., p.p.m. | Mortality produced, percent | | | | |
|---|---|---|---|---|---|---|---|
| | | | Mexican bean beetle larvae | Spider mites contact | | Bean aphids contact | House fly spray |
| Described in Example— | Structure | | | Adults | Nymphs | | |
| 1 | $(C_2H_5O)_2\overset{\overset{\displaystyle\parallel}{S}}{P} S\, CH{=}\overset{\overset{\displaystyle\vert}{CH_3}}{C}\, S\, C_2H_5$ | 50 | 100 | 100 | 100 | 100 | 100 |
| | | 20 | 70 | 100 | 100 | 100 | 100 |
| | | 10 | 0 | 100 | 100 | 100 | 75 |
| | | 5 | 0 | 100 | 60 | 100 | 0 |
| 2 | $(C_2H_5O)_2\overset{\overset{\displaystyle\parallel}{S}}{P} S\, CH{=}CHSC_2H_5$ | 50 | 90 | 100 | 0 | 100 | 100 |
| | | 20 | 20 | 100 | 0 | 100 | 100 |
| | | 10 | 0 | 100 | 0 | 100 | 0 |
| | | 5 | 0 | 100 | 0 | 100 | 0 |

The data show that both vinylic esters are highly effective, broad spectrum pesticides. They are particularly active as contact sprays against mites and aphids. It is interesting to observe, however, that the propenyl compound of the present invention also controls the mite-nymphs after 5 days while the disclosed vinyl compound does not exhibit such control.

EXAMPLE 13 — Comparative Pesticidal Testing of S-2-Alkylthiopropenyl Diethyl Thiophosphates with Commercial Thiophosphates S-2-Alkylthiopropenyl diethyl dithiophosphates of Example 1 and monothiophosphates of Example 3 were tested against a variety of pests. As structurally related commercial standards 2-ethylthioethyl diethyl dithiophosphate (Disyston) and monothiophosphate (Systox) were used. The data are given in Table VII.

The data show that the new compositions are all highly effective, wide spectrum pesticides. In comparison to Systox and Disyston, they are significantly more effective against the larvae of the Mexican bean beetle and houseflies. They are also active against the corn rootworm larvae and root knot nematodes. At the routine test concentrations Systox and Disyston show no positive effect on these latter two pests.

It is also noted that the median cholinesterase inhibiting concentration of the new 2-alkylthiopropenyl derivatives is smaller, i.e., their potential pesticidal effectiveness is higher, than that of Disyston.

EXAMPLE 14 — Comparative Pesticidal Testing of Adducts of Diethoxy Thiophosphoryl Alkyl Disulfides with Various Acetylenes A series of diethoxy thiophosphoryl alkyl disulfidemethylacetylene adducts were tested at first to determine the effect of the size of the alkylthio group on their pesticidal activity. The results are shown by Table VIII.

A comparison of the activity of the methylacetylene adducts derived by the procedure of Example 1 indicates that the methylthio, ethylthio and n-propylthio derivatives are about equivalent in primary, contact insecticidal tests. The systemic activity of the higher molecular weight n-propylthio derivative is, however, definitely less than that of the other two compounds. In the case of the n-butylthio derivative there is a further decrease of activity. This decrease of activity is, in general, not accompanied by corresponding changes in the median cholinesterase inhibiting effectiveness of these compounds. It is felt that the observed changes in the insecticidal activity were a reflection in the transport properties, affecting how much of the particular compound will reach the site of action.

Table VIII also shows the activity of a propargyl chloride and an ethyl propiolate adduct. These adducts show less activity compared with the corresponding methylacetylene adducts. It is particularly apparent that the derivatives totally lack any systemic pesticidal activity. This is thought to be due to their insufficient solubility in the plant sap system.

EXAMPLE 15 — Pesticidal activity of Adducts of Dialkoxy Phosphoryl and Thiophosphoryl Disulfides with Various Acetylenes Adducts of symmetrical phosphoryl disulfides, prepared according to the method described in Examples 5 and 6 were also examined for their pesticidal activity. The data for the methylacetylene and propargyl chloride adducts are shown in Tables IX and X. These tables also show the activity of the ethylene adducts of dimethoxy thiophosphoryl and diethoxy thiophosphoryl disulfides, respectively. These saturated S-1,2-ethylene bisdialkyl dithiophosphate esters were prepared by the diaddition of the corresponding dithiophosphoric acids to acetylene.

The data of Tables IX and X show that all the vinylic bis-dithiophosphate adducts are effective contact insecticides and miticides when applied as a spray at a concentration of 250 ppm. The mechanism of action indicated by the high effectiveness of the adducts in inhibiting the cholinesterase enzyme.

Compared to the vinylic bis-dithiophosphates, the structurally related saturated bis-dithiophosphates are weaker pesticides. Their smaller pesticidal potential is also shown by their lesser effectiveness as cholinesterase inhibitors.

Probably due to their high molecular weights, these adducts were not active as systemic pesticides. They were also relatively ineffective as soil pesticides.

While the novel compositions claimed are generally useful as animal and plant pesticides, it was found that certain compositions are more attractive for economical use; lesser amounts of these compounds being sufficient for pest control. Most specifically it was found that the lower alkyl compounds derived by the addition of dialkoxy phosphoryl and thiophosphoryl alkyl disulfides to alkylacetylenes are outstanding wide spectrum pesticides, having both contact and systemic action.

It is to be understood that the invention is not limited to the various embodiments and specific examples shown above since these have been offered merely as illustrations. Other phosphoryl disulfide-acetylene adducts can be prepared and used and other modifications can be made without departing from the spirit and purview of this invention. The proprietary limits of the invention are defined by the following claims.

What is claimed is:

1. A selective process for the preparation of primary S-vinylic esters of diorganothiophosphorous acids comprising adding in the liquid phase in the presence of a free radical initiator one molar equivalent of a diorgano phosphoryl disulfide of the formula

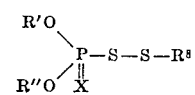

wherein $R'$, $R''$ and $R^8$ are $C_1$ to $C_4$ alkyl radicals and X is O or S to the triple bond of an acetylenic compound of the formula

$$R_4 - C \quad C - H$$

wherein $R^4$ is selected from the group consisting of $C_1$ to $C_4$ alkyl, phenyl, and chloro substituted phenyl radicals.

TABLE VII.—COMPARATIVE PESTICIDAL TESTING OF S-ALKYLTHIOPROPENYL THIOPHOSPHATES AND COMMERCIAL THIOPHOSPHATES

| Experimental compound tested | | | Mexican bean beetle larvae, contact | Two spotted spider mites | | | | Bean aphids | | House fly spray | Special test corn rootworm | | Special test nematodes at 25 lb./acre control, percent | Cholinesterase inhibiting conc. $LD_{50}$ (mole/liter) |
|---|---|---|---|---|---|---|---|---|---|---|---|---|---|---|
| Identification Ex. No. (commercial control) | Structure | Conc., p.p.m. | | Contact | | Systemic | | Contact | Systemic | | Conc., p.p.m. | Mortality larvae, percent | | |
| | | | | Mites | Nymphs | Mites | Nymphs | | | | | | | |
| 1 | $(C_2H_5O)_2\overset{S}{\overset{\|}{P}}SCH=C-SCH_3$ $\qquad\qquad\quad|$ $\qquad\qquad\;\;CH_3$ | 100 50 20 10 | 100 100 20 0 | 100 100 100 100 | 100 100 | 100 100 | 60 40 | 100 100 100 | 100 100 | 100 100 95 40 | 2.5 0.6 | 100 40 | 90 | $1.1\times10^{-6}$ |
| 1 | $(C_2H_5O)_2\overset{S}{\overset{\|}{P}}SCH=C-SC_2H_5$ $\qquad\qquad\quad|$ $\qquad\qquad\;\;CH_3$ | 100 50 20 10 | 100 100 100 | 100 100 60 | 100 100 | 80 20 | 100 100 100 | 100 80 | 100 100 95 80 | 2.5 0.6 | 100 100 | 100 | $1.5\times10^{-6}$ |
| 3 | $(C_2H_5O)_2\overset{O}{\overset{\|}{P}}SCH=C-SCH_3$ $\qquad\qquad\quad|$ $\qquad\qquad\;\;CH_3$ | 100 50 20 10 | 100 100 100 | 100 100 100 | 100 30 | 100 100 | 100 80 | 100 100 100 | 95 80 | 100 100 100 | 2.5 0.6 | 100 90 10 | 50 | $1.3\times10^{-3}$ |
| 3 | $(C_2H_5O)_2\overset{O}{\overset{\|}{P}}SCH=C-SC_2H_5$ $\qquad\qquad\quad|$ $\qquad\qquad\;\;CH_3$ | 100 50 20 10 | 100 100 100 80 | 100 100 100 | 100 50 | 100 10 | 50 0 | 100 100 100 | 80 10 | 100 100 100 | 2.5 0.6 | 100 60 | 100 | $2.3\times10^{-7}$ |
| (SYSTOX) | $\begin{array}{c}C_2H_5O\quad O\\ \diagdown\;\;\|\\ P\text{—SCH}=C-SC_2H_5\\ \diagup\qquad\quad|\\ n\text{-}C_3H_7S\qquad\;\;CH_3\end{array}$ | 100 50 20 10 | 100 100 50 0 | 100 100 100 | 100 100 | 100 90 | 100 60 | 100 100 100 | 100 100 40 | 100 100 100 85 | 2.5 0.6 | 100 20 | 35 | $1.8\times10^{-7}$ |
| (SYSTOX) | $(C_2H_5O)_2\overset{O}{\overset{\|}{P}}SCH_2CH_2-SC_2H_5$ | 100 50 20 10 | 100 90 30 0 | 100 100 100 | 100 90 | 100 100 | 90 60 | 100 100 100 | 100 100 | 100 70 0 0 | 2.5 0.6 | 20 0 | 0 | |
| (DISYSTON) | $(C_2H_5O)_2\overset{S}{\overset{\|}{P}}SCH_2CH_2-SC_2H_5$ | 100 50 20 10 | 30 0 0 | 100 100 100 | 100 100 | 100 90 | 100 50 | 100 100 100 | 100 100 | 100 100 80 0 | 2.5 0.6 | 20 0 | 0 | $3.8\times10^{-4}$ |

TABLE VIII.—PESTICIDAL ACTIVITY OF ADDUCTS OF DIALKOXYTHIOPHOSPHORYL ALKYL DISULFIDES WITH METHYLACETYLENE, PROPARGYL CHLORIDE AND ETHYL PROPIOLATE

| Experimental compound tested, structure | Conc., p.p.m. | Mexican bean beetle larvae, contact | Two spotted spider mites Contact Mites | Two spotted spider mites Contact Nymphs | Systemic mites | Bean aphids Contact | Bean aphids Systemic | House fly spray | Mortality, percent corn rootworm larvae (at 2.5 p.p.m.) | Control, percent nematodes at 25 lb./acre | Cholinesterase inhibiting conc. LD$_{50}$ (mole/liter) |
|---|---|---|---|---|---|---|---|---|---|---|---|
| $(CH_3CH_2O)_2P(=S)-S-CH=C(-SCH_3)-CH_3$ | 250 | 100 | 100 | 100 | 100 | 100 | 100 | 100 | 100 | 90 | $1.1 \times 10^{-6}$ |
| $(CH_3CH_2O)_2P(=S)-S-CH=C(-SCH_2CH_3)-CH_3$ | 250 | 100 | 100 | 100 | 100 | 100 | 100 | 100 | 100 | 90 | $1.5 \times 10^{-6}$ |
| $(CH_3CH_2O)_2P(=S)-S-CH=C(-SCH_2CH_2CH_3)-CH_3$ | 250 | 100 | 100 | 0 | 0 | 100 | 40 | 100 | — | 10 | — |
| $(CH_3CH_2O)_2P(=S)-S-CH=C(-SCH_2CH_2CH_3)-CH_3$ | 250 | 100 | 100 | 0 | 0 | 100 | 20 | 100 | 80 | 10 | $1.1 \times 10^{-6}$ |
| $(CH_3CH_2O)_2P(=S)-S-CH=C(-SCH_2CH_3)-CH_2Cl$ | 250 | 0 | 100 | 20 | 0 | 100 | 10 | 100 | 60 | 10 | $1.9 \times 10^{-7}$ |
| $(CH_3CH_2O)_2P(=S)-S-CH=C(-SCH_3)-CO_2CH_2CH_3$ | 250 | 0 / 50 / 10 | 100 | 0 | 0 | 50 | 10 | 30 | 0 | 10 | $2.2 \times 10^{-7}$ |
| $(CH_3CH_2O)_2P(=O)-S-CH=C(-SCH_2CH_2CH_3)-CH_3$ | 250 | 100 | 100 | 100 | 8 | 100 | 50 | 100 | 100 | 10 | $1.5 \times 10^{-8}$ |

TABLE IX.—PESTICIDAL ACTIVITY ADDUCTS OF DIMETHOXYPHOSPHORYL AND DIMETHOXYTHIOPHOSPHORYL DISULFIDE WITH METHYLACETYLENE AND PROPARGYL CHLORIDE

| Chemical structure of compound tested | Mortality of pest produced by a 250 p.p.m. spray, percent | | | | | Cholinesterase inhibiting conc. LD$_{50}$ (mole/liter) |
|---|---|---|---|---|---|---|
| | Mexican bean beetle | Spider | | Bean aphids | House flies | |
| | | Mites | Nymphs | | | |
| $(CH_3O)_2\underset{\underset{O}{\parallel}}{P}-S-CH=\underset{\underset{CH_3}{\mid}}{C}-S-\underset{\underset{O}{\parallel}}{P}(OCH_3)_2$ | 90 | 100 | 10 | 100 | 100 | $1.8 \times 10^{-7}$ |
| $(CH_3O)_2\underset{\underset{S}{\parallel}}{P}-S-CH=\underset{\underset{CH_3}{\mid}}{C}-S-\underset{\underset{S}{\parallel}}{P}(OCH_3)_2$ | 100 | 100 | 100 | 100 | 100 | |
| $(CH_3O)_2\underset{\underset{O}{\parallel}}{P}-S-CH=\underset{\underset{Cl-CH_2}{\mid}}{C}-S-\underset{\underset{O}{\parallel}}{P}(OCH_3)_2$ | 60 | 100 | 80 | 100 | 100 | $8.9 \times 10^{-8}$ |
| $(CH_3O)_2\underset{\underset{S}{\parallel}}{P}-S-CH_2-CH_2-S-\underset{\underset{S}{\parallel}}{P}(OCH_3)_2$ | 60 | 90 | 70 | 80 | 100 | $3.8 \times 10^{-5}$ |

TABLE X.—PESTICIDAL ACTIVITY OF ADDUCTS OF DIETHOXYPHOSPHORYL AND DIETHOXYTHIOPHOSPHORYL DISULFIDE WITH METHYLACETYLENE AND PROPARGYL CHLORIDE

| | Mortality of pest produced by a 250 p.p.m. spray, percent | | | | | Cholinesterase inhibiting conc. LD$_{50}$ (mole/liter) |
|---|---|---|---|---|---|---|
| | Mexican bean beetle | Spider | | Bean aphids | House flies | |
| | | Mites | Nymphs | | | |
| $(CH_3CH_2O)_2\underset{\underset{O}{\parallel}}{P}-S-CH=\underset{\underset{CH_3}{\mid}}{C}-S-\underset{\underset{O}{\parallel}}{P}(OCH_2CH_3)_2$ | 100 | 100 | 80 | 100 | 100 | $1.5 \times 10^{-8}$ |
| $(CH_3CH_2O)\underset{\underset{S}{\parallel}}{P}-S-CH=\underset{\underset{CH_3}{\mid}}{C}-S-\underset{\underset{S}{\parallel}}{P}(OCH_2CH_3)_2$ | 40 | 100 | 90 | 100 | 100 | |
| $(CH_3CH_2O)_2\underset{\underset{S}{\parallel}}{P}-S-CH=\underset{\underset{Cl-CH_2}{\mid}}{C}-S-\underset{\underset{S}{\parallel}}{P}(OCH_2CH_3)_2$ | 20 | 100 | 50 | 100 | 100 | $2.4 \times 10^{-6}$ |
| $(CH_3CH_2O)_2\underset{\underset{S}{\parallel}}{P}-S-CH_2-\underset{\underset{CH_3}{\mid}}{CH}-S-\underset{\underset{S}{\parallel}}{P}(OCH_2CH_3)$ | 40 | 70 | 60 | 80 | 70 | $5.2 \times 10^{-5}$ |

\* \* \* \* \*